United States Patent [19]

Harris

[11] 4,427,145
[45] Jan. 24, 1984

[54] PACKING OF NAIL PLATES

[75] Inventor: Roderick E. Harris, Miami, Fla.

[73] Assignee: Gang-Nail Systems, Inc., Miami, Fla.

[21] Appl. No.: 337,455

[22] Filed: Jan. 6, 1982

[51] Int. Cl.³ ............................................. B65G 57/28
[52] U.S. Cl. ........................................ 225/97; 29/413;
29/417; 198/374; 225/98; 225/104; 414/105;
414/108; 414/780; 414/786; 493/448
[58] Field of Search ................... 414/30, 55, 103–109,
414/780, 781, 786; 198/374; 271/214; 29/413,
417; 225/93, 97, 98, 103, 104; 493/448, 457;
156/204, 474

[56] References Cited

U.S. PATENT DOCUMENTS

| | | | |
|---|---|---|---|
| 2,725,992 | 12/1955 | Wells | 414/108 X |
| 3,490,612 | 1/1970 | Webers et al. | 414/55 |
| 3,729,191 | 4/1973 | Yoshimura et al. | 271/214 |
| 3,963,452 | 6/1976 | Jureit | 206/343 X |
| 4,201,119 | 5/1980 | Wolf | 493/457 |

FOREIGN PATENT DOCUMENTS

| | | | |
|---|---|---|---|
| 2846448 | 4/1980 | Fed. Rep. of Germany | 198/374 |
| 54-97972 | 8/1979 | Japan | 414/30 |
| 727438 | 4/1980 | U.S.S.R. | 414/107 |

*Primary Examiner*—Leslie J. Paperner
*Attorney, Agent, or Firm*—LeBlanc, Nolan, Shur & Nies

[57] ABSTRACT

A stacking machine and method for pairing and stacking metal plates having teeth struck out and protruding therefrom, which plates are commonly referred to as nail plates. The nail plates that are to be stacked are supplied to a supply section of the machine in streams of longitudinally extending metal plates as the plates exit from a stamping machine. It is in the stamping machine that the teeth forming the nails of the plates are struck out from the plates. These nail plates are supplied to a stacking section of the stacking machine two plate lengths at a time. The stacking section receives the pair of metal plates, which also can be two plate sections with each section being formed of several plates, in a longitudinally extending relationship from the supply section and then reorientates the two metal plates so that the two plates are in a face-to-face orientation. The pairs of plates are then transferred to a stack receiving section. The stack receiving section receives and holds the plates in a stacked face-to-face relationship with teeth protruding from any adjacent metal plates towards each other being intermeshed.

20 Claims, 8 Drawing Figures

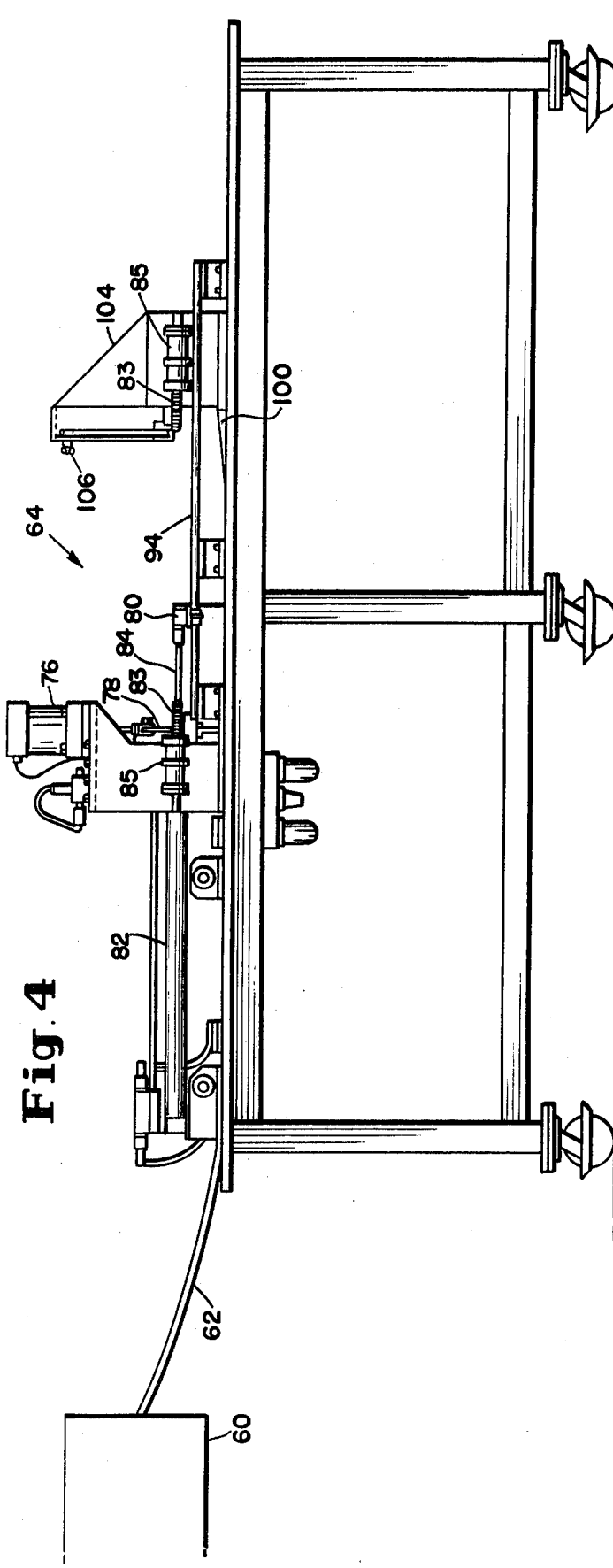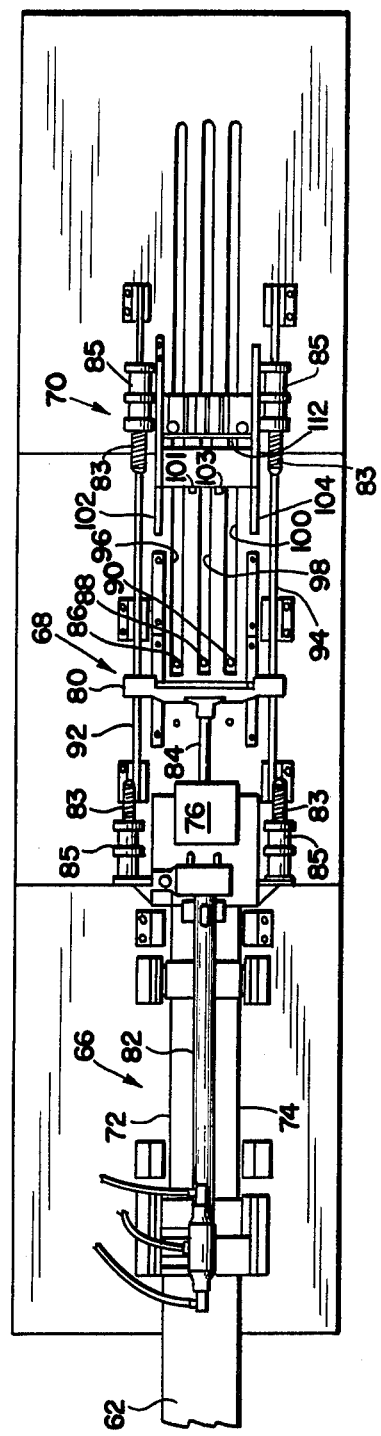
Fig. 4
Fig. 5

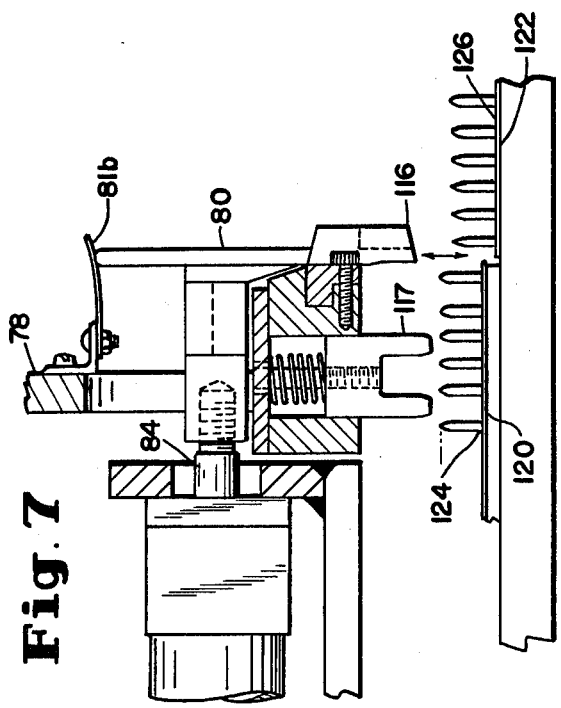
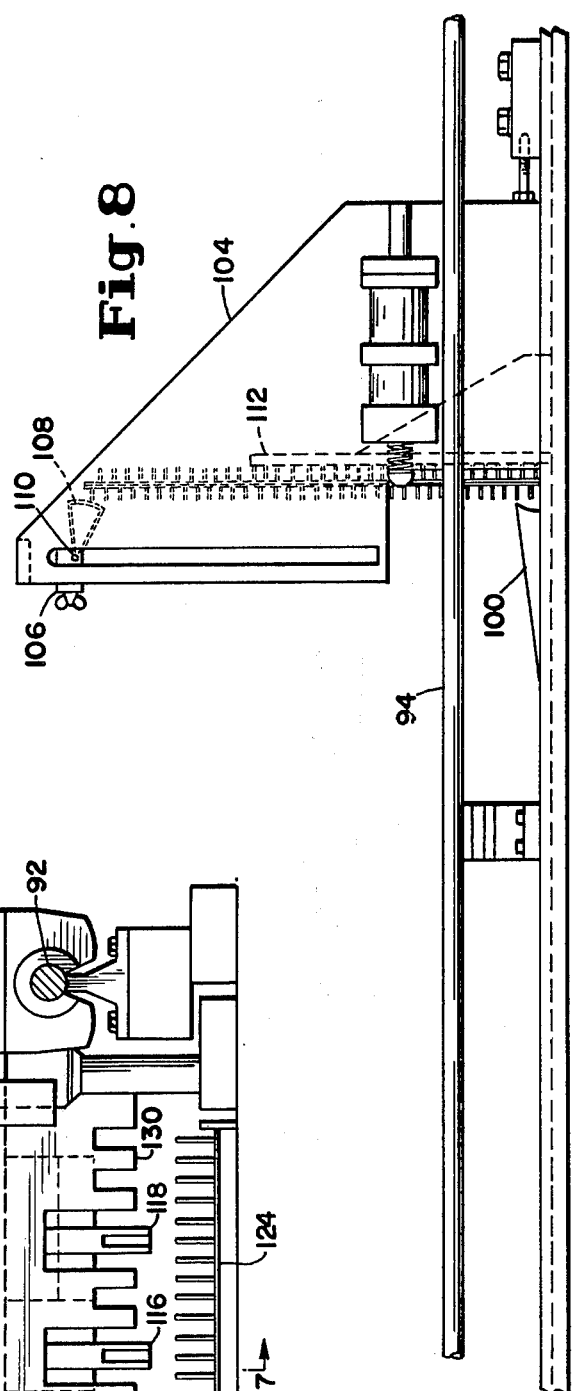
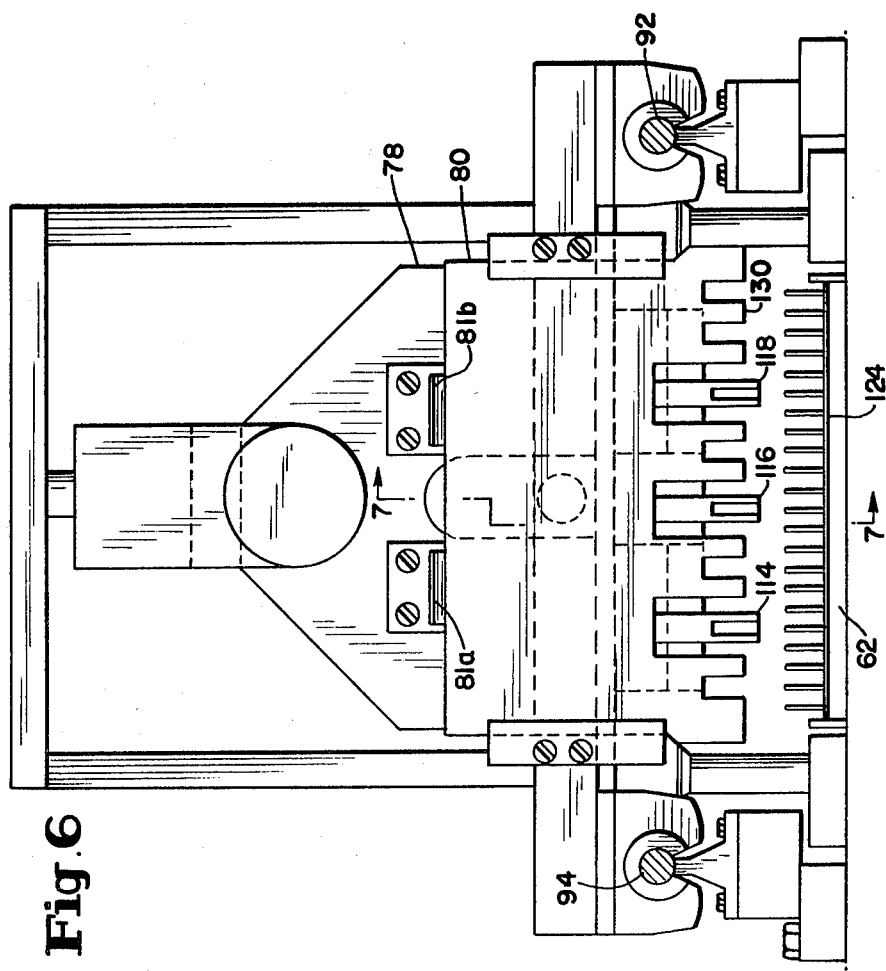

PACKING OF NAIL PLATES

BACKGROUND OF THE INVENTION

The present invention relates to a machine and procedure for packing of nail plates.

Sheet metal plates having a plurality of teeth struck out from the plates so as to form nails have been marketed for many years for use in the construction industry for forming wooden joints. Exemplary of these types of nail plates are those shown in U.S. Pat. No. 3,390,902 to J. C. Jureit entitled WOOD JOINT AND CONNECTOR THEREFORE and U.S. patent application Ser. No. 71,551 to Moyer et al. filed Aug. 30, 1979 and entitled STRUCTURAL JOINT CONNECTOR, now U.S. Pat. No. 4,343,580, the subject matter of both of which are hereby incorporated by reference.

These various nail plates are formed by feeding a continuous web of sheet metal (typically 18 or 20 gauge) into a stamping machine. In the stamping machine, with the use of punch and die sets, the teeth are stamped out of the continuous web of sheet metal. In addition, the sheet metal is at least partially or totally scored for separating the sheet metal web into the various separate plates.

As the stamped out nail plates exit from the stamping machine, the plates are packed by any one of a variety of techniques, most of which are extremely labor intensive in carrying out such operations. The various common techniques for packing the nail plates exiting from the stamping machine include: tumble packing the plates in a box; hand packing the plates with the teeth of adjacent plates facing each other and intermeshed then placing them in a box; forming a stack of breakaway plates where the plates are only partially scored and stored in long sheets; rolling a continuous stream of the plates onto a spool so as to form a coil of the nail plates; and forming bar stock where the teeth are only scored so as to form large sections such as section 6 inches by 48 inches which are then further cut by the customer. Several of these operations include manually pairing and stacking the plates or sheets of plates, which stacks then can be packed in a box or banded together. Exemplary of the packing operation in which large scored sheets or uncut sheets are stacked is illustrated in U.S. Pat. No. 3,963,452 to J. C. Jureit et al. Exemplary of a packing operation in which coils of the nail plate stock are rolled up on a spool are illustrated in U.S. Pat. Nos. 3,895,708 to J. C. Jureit et al. and 4,129,933 to J. C. Jureit et al.

The general type of packing operation of primary concern in connection with the present invention relates to that type of operation in which either the connector plates or sections of plates are arranged in stacks. These stacks then are packed in a box for shipment or the sections of plates are banded together and shipped.

In tumble packing the connector plates, as the plates exit from the stamping machine they have been totally scored so as to form the separate plates. The plates then are merely conveyed along a conveyor belt and dropped into a box located at the end of such belt, i.e. tumble packed in the box. While the tumble packing operation is relatively inexpensive since there is very little labor involved in the packing operation there is a large amount of space inefficiency since the box is not packed with as great a quantity of plates as possible with other packing techniques. Alternatively, the plates can be formed in a stack with the teeth of adjacent plates being intermeshed and then stacks of plates placed in the box; this technique is carried out in a hand packing operation which is highly labor intensive thereby tremendously increasing the cost of such packing operation. The hand packing of the plates in the box, however, provides for a much greater concentration of the plates in the box so as to increase space efficiency. The other techniques for forming stacks of plates, either breakaway plates or bar stock where the plates are later cut at the customer location, are efficient from the viewpoint of shipping of the plates but require a tremendous amount of labor since the stacks are formed by operators picking up each individual plate or strip of plates and forming the stacks.

SUMMARY OF THE INVENTION

An object of the present invention is to provide improved packing procedure and operation for enabling efficient packing of nail plates as they exit from a stamping machine in which the plates are formed.

Another object of the present invention is to provide an efficient packing operation for packing of nail plates with a relatively low labor requirement.

A further object of the present invention is to provide an automatic operation for stacking and packing nail plates as they exit from a stamping machine in which the plates are formed.

Still another object of the present invention is to provide a machine for automatically and efficiently forming a stack of nail plates with the teeth of adjacent plates facing each other being intermeshed for enabling such stacks of plates to then be either banded together or packed within a box.

A still further object of the present invention is to provide a machine usable for assisting in a low labor intensive, efficient operation for stacking and packing of nail plates as the plates exit from a stamping machine in continuous longitudinally extending streams.

These objectives of the present invention are carried out by the use of the stacking machine and operation of the present invention. The stacking machine pairs and stacks the sheet metal nail plates as they leave the stamping machine.

In the stamping machine, the teeth are struck out from the plates and a longitudinally extending stream of such nail plates are fed out of the stamping machine. The nail plates in the exiting stream of plates are partially scored at the interface between the plates so that successive plates in the stream are only attached by a limited number of small metal tabs. The streams of plates after leaving the stamping machine enter the stacking machines. The plates are supplied to a stacking section of the stacking machine where the plates are accepted two lengths at a time and separated from the stream of plates. While references are made herein to the selection of two metal plates and a pair of plates, such references include two individual plates as well as two plate sections where each section may be made up of a plurality of small interconnected plates.

In the stacking section, the longitudinally extending pairs of plates are folded so that the two plates are in a face-to-face orientation, actually back-to-back, with the teeth of these two plates pointing away from each other. The two plates in the back-to-back orientation are then transferred to a stack receiving section. In the stack receiving section, the plates are held and maintained in a face-to-face relationship with the teeth that are protruding from adjacent metal plates towards each other being intermeshed.

The folded pairs of plates that are transferred from the stacking section to the stacked receiving section are reoriented from a horizontal position to a vertical position during the folding operation. The two vertical plates are then transferred to the stack receiving section where a horizontally expanding stack of such plates is formed. The stack receiving section includes a spring biased holding plate for enabling additional folded pairs of plates to be added to the expanding horizontally extending stack of plates with the stack being properly and securely maintained. The plates that are supplied to the stacking machine in a continuous stream of plates from the metal plate stamping machine are interconnected by several tabs which can be easily broken during the folding and stacking operations. In order to separate the pair of plates from the continuous stream, a rapid downward vertical force is applied at the interface between the two plates to be separated from the stream of plates so as to create relative vertical movement between the pair of plates and the stream of plates thereby breaking the tabs. Next, a small upward vertical force is applied at the interface between the two plates of the pair of plates to be folded for initiating the folding operation. A sweeping member completes the operation of folding the pair of plates and reorientating the plates into a vertical orientation. The sweeping member also sweeps the folded plates towards and transfers such plates into the stack receiving section.

The stack receiving section has a movable plate against which the stack is formed as the folded pairs of plates are transferred into such section. This movable plate member is spring biased towards the stacking section for providing a force for maintaining in alignment the stack of adjacent vertically orientated plates. As additional folded pairs of plates are added to the stack, the stack extends in a horizontal direction and the plate member of the stack receiving section moves for providing an expandable area for the expanding stack. There is also a member for preventing the plates that are added to the horizontally extending stack from falling back towards the stacking section.

BRIEF DESCRIPTION OF THE DRAWINGS

FIG. 4 is a side elevational view of an embodiment of a stacking machine constructed in accordance with the present invention.

FIG. 5 is a top plan view of the stacking machine illustrated in FIG. 4.

FIG. 6 is a front plan view of the severing and sweeping mechanism of the stacking machine illustrated in FIGS. 4 and 5.

FIG. 7 is a side elevational partial sectional view of a portion of the severing mechanism of the stacking machine illustrated in FIGS. 4 and 5, with the view being taken along lines 7—7 in FIG. 6.

FIG. 8 is a side elevational view of a portion of the stack receiving section of the stacking machine illustrated in FIGS. 4 and 5.

DESCRIPTION OF THE PREFERRED EMBODIMENT

Figure 1:
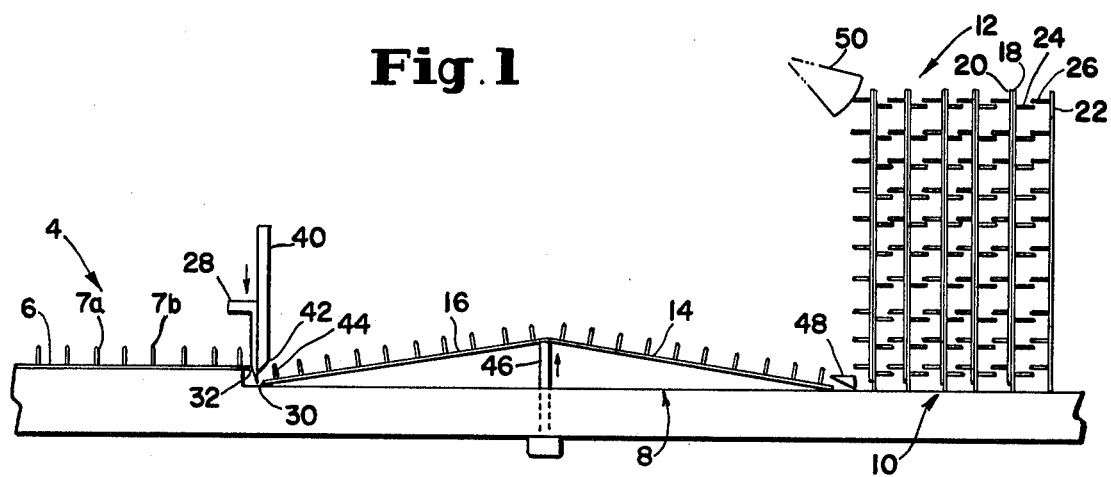
FIG. 1 is a diagrammatic view of a stacking machine operating in accordance with the present invention with the illustration showing the initiation of the folding operation of a pair of nail plates.

A stacking machine 2 constructed and operated in accordance with the present invention is supplied in its supply section 4 with a continuous longitudinally extending stream of nail plates 6 such as shown in FIG. 1. The nail plates have stamped out therefrom a plurality of teeth such as represented by teeth 7a and 7b. These nail plates are fed two at a time to a stacking section 8 such as represented by plates 14 and 16.

The synchronization of the feeding of the plates to the stacking section is coordinated with the rate at which the plates exit from the receiving machine. The stream of plates leaving the stamping machine exit in an incremental movement operation. The stream of plates advances an incremental step each time another set of teeth are stamped out from the sheet metal in the stamping machine. Thus, the stamping and stacking operation should be time coordinated which can be accomplished by conventional techniques and equipment.

After plates 14 and 16 are folded in stacking section 8 they are transferred and added to a stack of plates 12 in stack receiving section 10. Plates 14 and 16 when folded are reorientated from their longitudinally extending position into a back-to-back orientation with the two plates being vertically arranged such as shown by plates 18 and 20 in stack of plates 12. When the folded plates are added to the stack of plates teeth of adjacent plates such as teeth 24 and 26 adjacent plates 18 and 22 are intermeshed.

Figure 3:
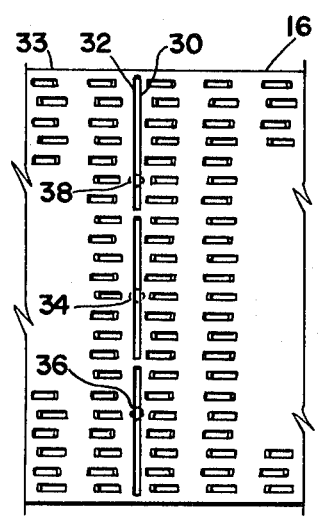
FIG. 3 is a top plan view of portions of two adjacent nail plates in the continuous stream of nail plates provided to the stacking machine of the present invention.

The stream of nail plates that is supplied by supply section 4 have the adjacent plates interconnected such as shown in FIG. 3. Plate 16 is connected to the adjacent plate 33 at the end of stream 6 by a plurality of tabs such as tabs 34 and 36. The tabs interconnect ends 30 and 32 of plates 16 and 33, respectively. With the exception of the several tabs, the two plates already have been partially separated by the formation of several slots such as slot 38 at the location where the plates are to be severed.

As the stream of plates advance so that plates 14 and 16 enter the stacking section, the advancement of the plates temporarily stop and plate 16 is severed from plate 33 by a downward force applied to plate 16 by servering member 28. The downward force created by severing member 28 merely acts to create relative movement of plate 16 to the stream of plates thereby breaking the tabs such as tabs 34 and 36. As the plates are severed by member 28, a set of pressure pads can be used for applying a holding force against the end of stream of plates 6.

Figure 2:
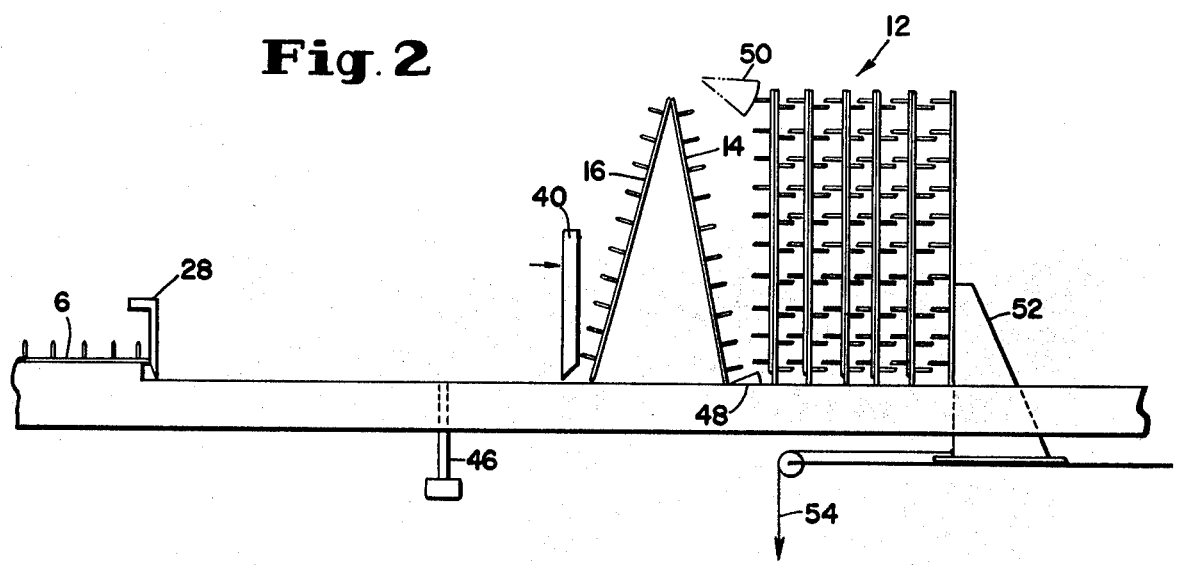
FIG. 2 is a diagrammatic view similar to FIG. 1 but illustrating a later stage of the folding operation of the pair of nail plates.

After plates 14 and 16 have been separated from the stream of plates, a series of hydraulically operated lift rods such as rod 46 apply a slight upward force at the interface between plates 14 and 16. Plates 14 and 16 also are interconnected by a series of tabs such as tabs 34 and 36 that interconnect plate 16 and 33. After the slight upward force is created so as to initiate the folding operation such as shown in FIG. 1, a sweeping member 40 completes the folding operation by applying a sweeping force to plate 16 such as shown in FIG. 2. Lower end 42 of sweeping member 40 contacts the end teeth 44 of plate 16 for applying pressure to such plate for causing the movement and folding operation of the plates.

As plates 14 and 16 are folded, the breaking of the interconnecting tabs is completed. Sweeping member 40 continues its movement towards the stack receiving section for transferring plates 14 and 16 to stack 12. Initially, pivotal member 48 is orientated in a slight upward direction such as shown in FIG. 1 so as to grip the bottom portion of plate 14 during the folding operation. As the folding operation is completed, however, gripping member 48 is pivoted downwardly into the position shown in FIG. 2. The movement of sweeping member 40 then causes folded plates 14 and 16 to slide upwardly on the inclined surface provided by gripping member 48 so as to enter the area of the stack. Simultaneously, pivotal retaining member 50 which retains the top of the end plate of the stack is pivoted upwardly by plates 14 and 16 as they are transferred to stack 12. Stack retaining member 50 is spring biased so as to automatically return to the position shown in FIGS. 1 and 2 after plates 14 and 16 are added to the stack so as to retain the additional added plates.

The stack of nail plates 12 that are formed in the stack receiving section are held in place by movable retaining plate member 52. Plate member 52 is spring biased towards stacking section 8 by a force applied to connecting member 54. As additional plates are added to stack 12, however, the addition of such plates causes plate member 52 to move away from the stacking section so as to expand the available space for the expanding stack 12.

An embodiment of a stacking machine 64 constructed and operated in accordance with the present invention is illustrated in FIGS. 4 and 5 with subparts thereof being further shown in FIGS. 6, 7 and 8. Stacking machine 64 is arranged adjacent to a stamping machine 60 in which the teeth are stamped out of the sheet metal for forming the nail plates. The nail plates leave stamping machine 60 in a longitudinally extending continuous stream which is fed along supply track 62 to supply section 66 of stacking machine 64.

In the operation of this particular embodiment of the stacking machine 64 illustrated, each of the plates would normally be a minimum width of 2 inches and a maximum width of 6 inches and a minimum length of $3\frac{1}{2}$ inches and a maximum length of 12 inches. The configuration and layout of the teeth can be of any type of construction such as those specific embodiments disclosed in the previously mentioned, commonly assigned patent and patent application. The length of the teeth can be any length up to approximately $\frac{5}{8}$ inches. While typically the plates are formed of either 18 or 20 gauge metal, the plates can be up to 14 gauge metal.

As the continuous stream of nail plates approach stacking section 68 of the stacking machine, they are guided through supply section 66 by guide members 72 and 74. The stream of plates are advanced in incremental steps so that two plates at a time are supplied to stacking section 68. After two plates are advanced, the two plates are separated from the stream of plates by a shearing member 78 which is actuated by hydraulic cylinder 76, illustrated in FIGS. 4 and 5. As discussed in greater detail below, shearing member 78 creates a downward force on the end of the two plates that have entered the stacking section so as to create relative movement between such end and the continuous stream of plates. This downward force merely breaks the tabs holding the plates together such as shown in FIG. 3.

After the pair of plates are separated from the stream of plates, the interface between the two plates is pushed slightly in an upward direction by a plurality of pushrods 86, 88 and 90, which are shown in FIG. 5. These pushrods lift the center of the pair of plates so as to cause the plates to form a small V formation. The pushrods then are immediately retracted and a sweeping member 80 applies a sweeping force to the plates so as to continue and complete the operation of folding the plates.

Sweeping member 80 contacts and pushes on the end teeth of the second plate of the pair of plates. The opposite end of the other plate of the pair of plates is held in place so that the sweeping force causes the two plates to continue to form a sharper V shape and eventually to be folded in a back-to-back orientation. The sweeping action of sweeping member 80 is imparted by hydraulic cylinder 82 which applies a force to rod 84 coupled to sweeping member 80. Sweeping member 80 travels along guide bars 92 and 94 as it is pushed towards stack receiving section 70 of stacking machine 64. After completing the folding operation, sweeping member 80 immediately returns to its original position adjacent the end of the continuous stream of plates being fed into the stacking section 68. The impact of the return of sweeping member 80 is cushioned by springs 83a and 83b and shock absorbing members 85a and 85b.

As the two plates are folded, the end of the plates adjacent to the stack receiving section can be held in place by a plurality of movable gripping members that prohibit forward movement of the plate until the two plates are folded. Two such gripping members 101 and 103 are illustrated in FIG. 5. After the plates are folded these gripping members are shifted into a downward position thereby allowing transfer of the folded plates from stacking section 68 to stack receiving section 70. As the plates are folded, the two plates are slid along upwardly inclined slide tracks 96, 98 and 100. As the two plates are then transferred from the stacking section to the stack receiving section, the top ends of the plates cause pivoting of top retaining member 108, which serves to hold the top of the stack in place in stack receiving section 70.

Both the structure and the operation of severing member 78 and sweeping member 80 can be better understood from the illustrations in FIGS. 6 and 7. Severing member 78 has a plurality of downwardly extending shearing blades 114, 116 and 118. The severing member has a spring force applied to it by leaf springs 81a and 81b. Positioned behind these blades are several pressure pads such as pad 117. Sweeping member 80 has several downwardly extending sweeping blades such as blades 128 and 130. After the two plates that are to be folded have been advanced into stacking section 68, pressure pad 117, shearing member 78 and sweeping member 80 are advanced in a downward direction. Pad 117 holds down the end of plate stream 124. The sweeping blades 128 and 130 initially serve to stabilize the end of the nail plate being severed from stream 124 of nail plates. Since the shearing blades extend further down than the sweeping blades, the shearing blades apply a downward force to plate 126 so as to force such plate in a downward direction towards table portion 122 within stacking section 68. Plate stream 124, however, still rests upon table portion 120 in supply section 66. The vertical force applied by the shearing blades breaks the tabs interconnecting plate 122 from plate stream 124.

The stack of plates are held in stack receiving section 70 between two side members 102 and 104 and a movable retaining plate 112. Movable retaining plates 112 is spring biased towards the stacking section for retaining the vertically extending plates of the horizontally extending stack such as shown in FIG. 8. The top of the stack of plates are held in place and prevented from falling back towards the stacking section by pivotal retaining member 108. Retaining member 108 is pivoted around pivot point 110 and can be adjusted in height by movement of wing nut 106. The bottom of the plates are held within the stack receiving section by the edge of the ramps, such as ramp 100, as shown in FIG. 8.

In order to accommodate plates of different lengths, both the sweeping member and shearing member along with the associated components as well as the stack receiving mechanism all can be moved closer to pushrods 86, 88 and 90. The shearing member and sweeping member should be spaced by an equal distance from the pushrods as the spacing between the pushrods and the gripping members 101 and 103 at the front end of stack receiving mechanism 70. In this manner the stacking mechanism can be adjusted to accommodate plates of different lengths. As previously mentioned, the stacking mechanism also is capable of accommodating plates of different widths. For accommodating such different widths, however, in the particular embodiment illustrated in FIGS. 4 through 8 no adjustment needs to be made in the equipment.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of eqivalency of the claims are therefor intended to be embraced therein.

What is claimed is:

1. Apparatus for pairing and stacking metal plates with teeth protruding therefrom, said apparatus comprising:
   supply means for supplying a stream of longitudinally extending metal plates to be stacked;
   stack receiving means for receiving and holding such metal plates in a stacked face-to-face relationship with teeth protruding from adjacent metal plates towards each other being intermeshed; and,
   stacking means operating upon two metal plates at a time for receiving such metal plates in a longitudinally extending relationship from said supply means, said stacking means including separating means for accepting a pair of plates from the stream of plates and separating such pair of plates from the stream of plates and folding means for subsequently separating the two plates from each other and folding such two plates in a back-to-back orientation with the teeth stamped out of each of the plates pointing away from each other and said stacking means transferring such metal plates in such orientation to said stack receiving means.

2. Apparatus according to claim 1 wherein: said supply means receives a continuous stream of metal plates exiting from a metal plate stamping machine where the teeth are stamped out of such plates and said supply means supplies such plates two at a time to said stacking means; said stacking means separates a pair of such plates from the continuous stream of plates and then folds the pair of plates transferring them from a longitudinal orientation to back-to-back orientation and including transfer means for transferring such folded plates to said stack receiving means in such a manner that teeth directed towards each other of any adjacent plates arranged in said stack receiving means are intermeshed; and, said stack receiving means includes expandable means for receiving and maintaining an expanding stack of such plates in their face-to-face orientation as received from said stacking means.

3. Apparatus according to claim 2 wherein: when said supply means supplies plates to said stacking means adjacent longitudinally extending plates are interconnected.

4. Apparatus according to claim 2 wherein said folding means includes sweeping means for folding the pair of plates and sweeping such folded plates towards said stack receiving means and into a vertical orientation.

5. Apparatus according to claim 4 wherein said stack receiving means includes a spring biased member for providing a force for maintaining in alignment the stack of adjacent vertically orientated plates with such stack extending in a horizontal direction and means for preventing plates added to such horizontally extending stack from falling back towards said stacking means.

6. Apparatus according to claim 3 wherein said separating means includes means for severing a pair of plates from the continuous stream of plates.

7. Apparatus according to claim 4, 5 or 6 wherein said stacking means includes lifting means arranged so as to lie adjacent to an interface between a horizontally orientated pair of plates and providing a vertical force for at least partially severing from each other such pair of plates and initiating the folding of such pair of plates and said sweeping means completes the folding operation.

8. Apparatus according to claim 6 wherein in the stream of plates supplied by said supply means adjacent plates are attached by several tabs, said severing means applies a perpendicular force to a pair of plates to be separated from the stream of plates for causing vertical movement of such pair of plates relative to the stream of plates for breaking the tabs and separating the pair of plates from the stream of plates.

9. Apparatus according to claim 2 or 4 further comprising guide means for maintaining lateral positioning of the stacked plates.

10. Apparatus according to claim 2 wherein said stacking means is adjustable for accommodating and stacking plates of different sizes.

11. Apparatus for pairing plates with teeth struck out from such plates protruding therefrom and arranging such plates into a stack with groups of teeth of any adjacent plates directed towards one another being intermeshed, said apparatus comprising: supply means for supplying a longitudinally extending stream of plates to said stacking means with adjacent longitudinally extending plates being interconnected; means for separating two plates at a time from an extending stream of plates supplied to said apparatus; stacking means for folding such pair of plates into a back-to-back relationship with their teeth pointing in opposite directions, said stacking means includes means for separating the two plates of a pair of plates and folding means for folding such two plates in a back-to-back relationship; and stack receiving means for forming a stack of such folded plates with the teeth of adjacent plates being intermeshed.

12. Apparatus according to claim 11 wherein: said stacking means when folding the pair of plates also reorientates them from a longitudinal orientation to a back-to-back vertical orientation and said stacking means includes transfer means for transferring such folded plates to said stack receiving means in such a manner that the teeth of adjacent plates arranged in said stack receiving means are intermeshed.

13. Apparatus according to claim 12 wherein: said stack receiving means includes expandable means for receiving and maintaining a horizontally expanding stack of plates in their vertical orientation as received from said stacking means.

14. Apparatus according to claim 12 wherein said folding means includes sweeping means for folding the pair of plates and sweeping such folded plates towards said stack receiving means in a vertical orientation.

15. Apparatus according to claim 14 wherein said stack receiving means includes a spring biased member for providing a force for maintaining the stack of vertical extending plates with such stack extending in a horizontal direction and means for preventing plates added to such horizontally extending stack from falling back towards said stacking means.

16. Apparatus according to claim 14 or 15 wherein said stacking means includes lifting means arranged so as to lie adjacent to the interface between horizontally orientated pair of plates and providing a vertical force for severing such pair of plates and initiating the folding of such pair of plates and said sweeping means completes the folding operation.

17. Apparatus according to claim 16 wherein in the stream of plates supplied by said supply means adjacent plates are attached by several tabs, said separating means applies a perpendicular force to a pair of plates to be separated from the stream of plates for causing vertical movement of such pair of plates relative to the stream of plates for breaking the tabs and separating the pair of plates from the stream of plates.

18. Apparatus according to claim 11 or 17 further comprising guide means for maintaining lateral positioning of the stacked plates.

19. Apparatus according to claim 11 or 17 wherein said stacking means is adjustable for accommodating and stacking plates of different sizes.

20. A method of pairing and stacking metal plates with each of the plates having teeth protruding therefrom, said method comprising the steps of:

supplying a continuous stream of longitudinally extending metal plates to be stacked and supplying such plates two at a time with adjacent longitudinally extending plates being interconnected;

receiving such metal plates two at a time in a longitudinally extending relationship in a stacking section;

separating a pair of such plates from the continuous stream of plates and then folding such pair of plates so as to transfer them from a longitudinal orientation to a back-to-back orientation;

subsequently transferring such folded plates to the stack receiving section in such a manner that teeth directed towards each other from adjacent plates arranged in said stack receiving section are intermeshed; and, receiving and holding such metal plates in a stack receiving section in a stacked face-to-face relationship with teeth protruding from adjacent metal plates towards each other being intermeshed.

* * * * *